Sept. 4, 1945. C. H. RODGERS ET AL 2,384,424
CONTACT APPARATUS
Filed July 16, 1943 3 Sheets-Sheet 3
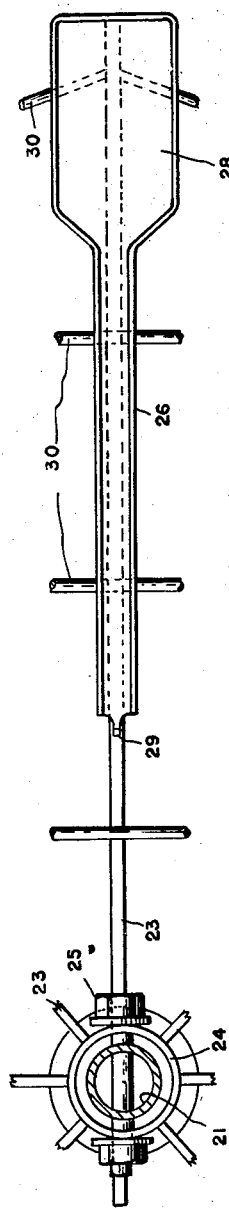
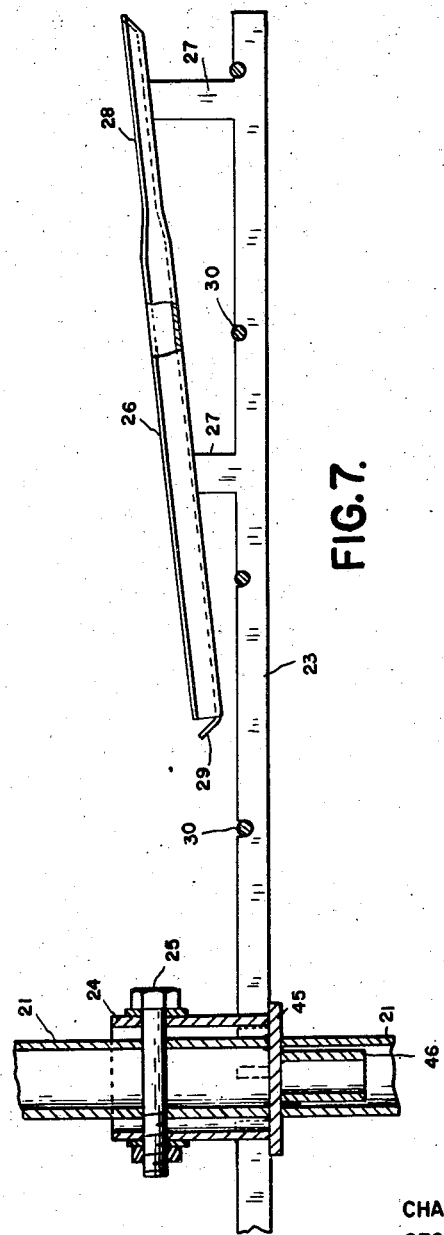
INVENTORS
CHARLES H. RODGERS
GEORGE C. NEUREUTHER
BY Arthur H. Stuart
ATTORNEY Patented Sept. 4, 1945

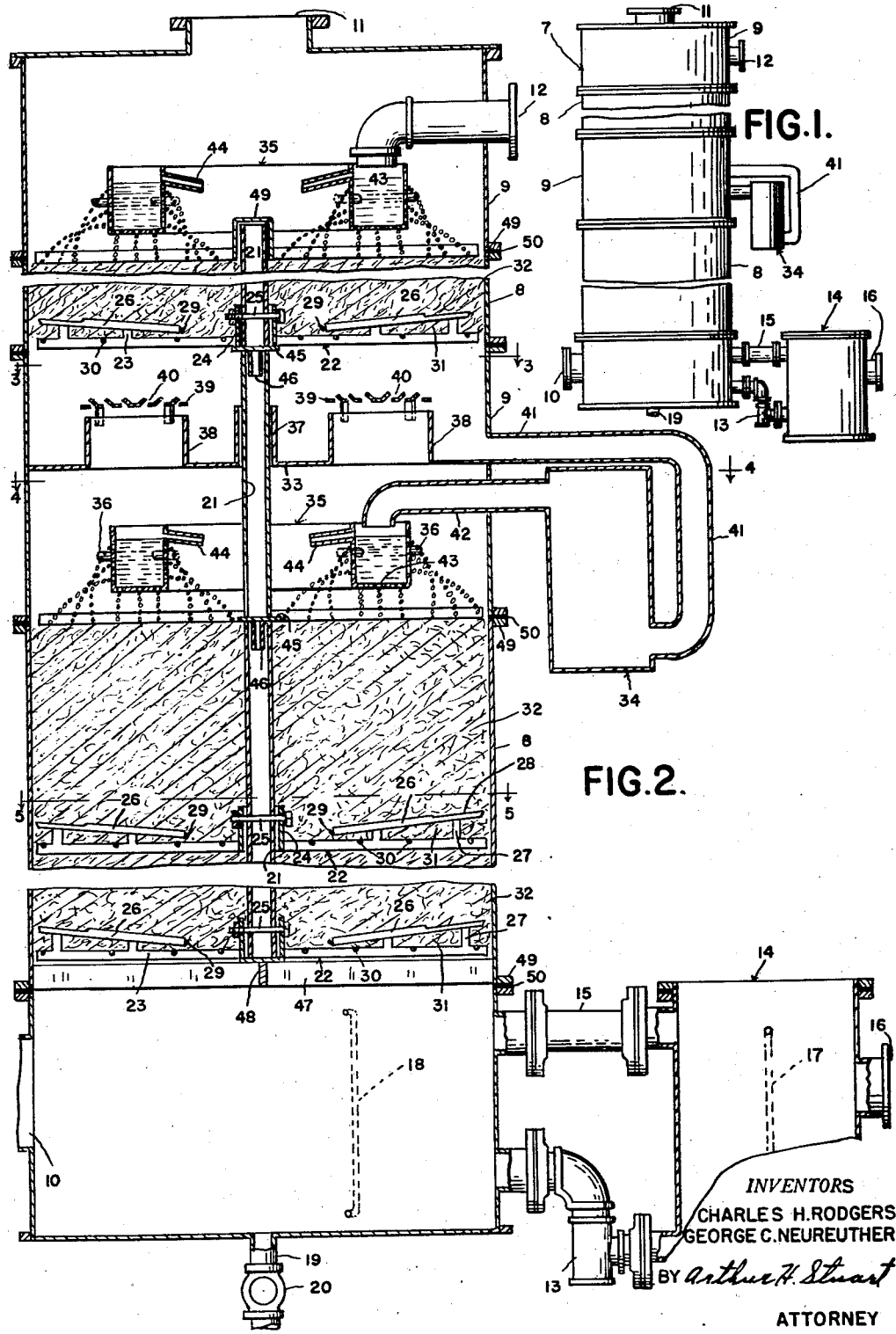

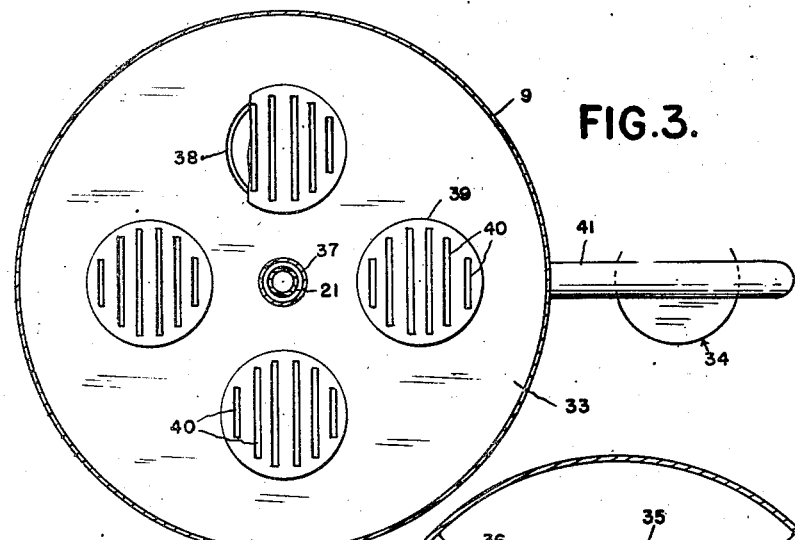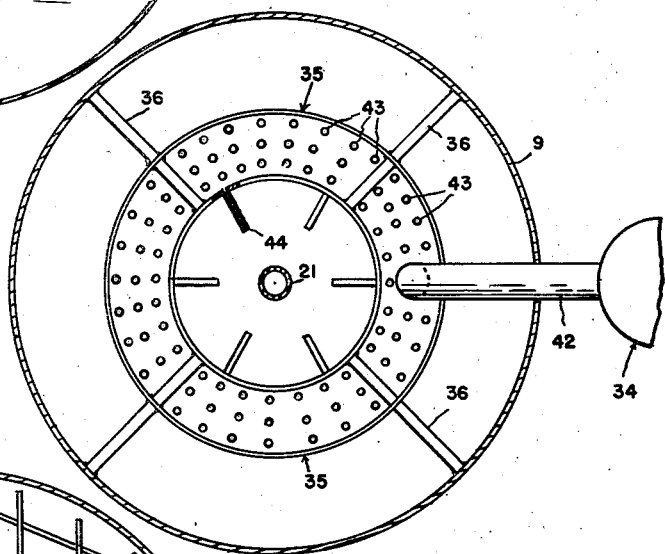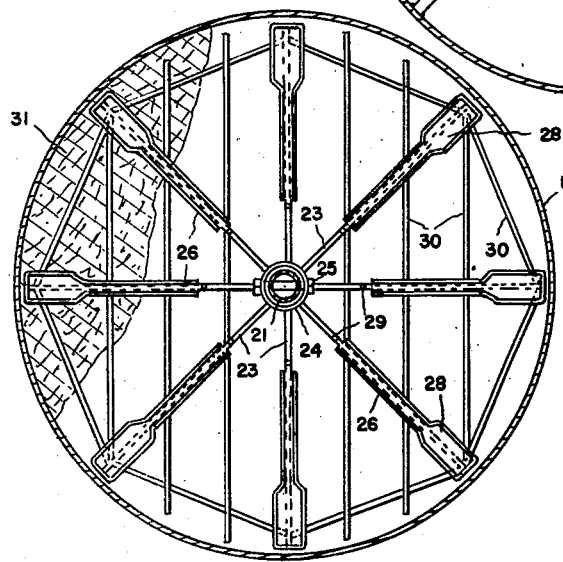

2,384,424

UNITED STATES PATENT OFFICE 2,384,424

CONTACT APPARATUS

Charles H. Rodgers, Peoria, and George C. Neureuther, Morton, Ill., assignors to Hiram Walker & Sons Inc., Peoria, Ill.

Application July 16, 1943, Serial No. 495,048

5 Claims. (Cl. 261—95)

This invention relates to improvements in apparatus for effecting contact between a liquid and a gas, and more particularly to a column or tower type of structure containing packing material for increasing the surface area of contact between liquid and gas. Such apparatus is used in operations where it is desirable to obtain intimate contact between a liquid and a gas, as for example in processes of rectification, absorption, air conditioning, and the like.

When a mixture of liquids of different volatilities is boiled the vapors are richer in the lower boiling component than was the original liquid. If these vapors pass up a column and are condensed, and a portion of the condensate is returned down the column, the rising vapors are further enriched in the lower boiling component by contact with this returning liquid reflux. The extent of such enrichment is determined by the number of successive contacts between vapor and liquid and also by the ratio of quantity of downflow to quantity of vaporization. This process results in a concentration of low boilers at the top of the column and high boilers at the bottom of the column, and is commonly known as fractionation or rectification.

If vapor or gases enter the bottom of a column and rise through downcoming cold liquid in which they are soluble, the vapors are dissolved in the liquid by successive contacts. The downcoming liquid concentrates the solute at the bottom of the column and the vapors or gases are recovered before they reach the top of the column. This is the commonly known absorption process, and here again the effectiveness is determined by the number of successive contacts and by the ratio of the quantity of downflow to the volume of rising vapors or gases.

Similarly, in air conditioning, for example, where a non-condensible and non-absorbable gas rises through a column in contact with a downflowing liquid, the effectiveness is determined by the number of successive contacts between gas and liquid, and by the ratio of the quantity of downcoming liquid to rising gases.

The aforementioned processes have several things in common, and require the same general type of equipment, which may be called a rectifying column, an absorption column, or an air conditioning column, depending upon the particular use to which it is put. In every case the process is dependent on thorough and successive intermingling of rising vapors or gases with downcoming liquid. It is also dependent on maintenance of the required ratios of downcoming liquid to rising vapors or gases. In every case this ratio may be decreased if the number of thorough interminglings is increased. If we let $o$ represent the moles of downcoming liquid and $v$ the moles of rising vapor, then $o/v$ expresses our column reflux condition. For example if 10 moles per minute are being vaporized, and 8 moles per minute are returning down the column, then $o/v$ is 8.

Our invention has for its principal objects the provision in contact apparatus of the character mentioned of means for promoting thorough intermingling of a gas with a liquid with which it is to be contacted and for maintaining a substantially constant $o/v$ value throughout the area of contact.

Packed columns have been used for many years with great diversity as to kinds of packing and types of arrangement but have generally been discarded in favor of plate columns because of one fault which has never been satisfactorily overcome. In a packed column the liquid invariably tends to migrate toward the outside of the column while the vapors rise at a higher rate toward the center of the column. Thus the $o/v$ value at the outer portion of the column may be many times that at the center of the column. Since there is an optimum desirable value for $o/v$, both the extremely high and the extremely low values are far from the optimum and impair or defeat the process.

We have corrected this fault through the present invention by providing any desired amount of liquid flow from the outside toward the center of the column, thus compensating for the natural migration in the opposite direction. In addition we have provided for complete redistribution of the liquid at desired intervals in order to collect and redistribute liquid which reaches the wall of the column where it cannot be picked up by the means provided for directing the flow toward the center of the column.

The structure provided in accordance with our invention for accomplishing the aforementioned results is illustrated in a preferred embodiment in the accompanying drawings in which:

Fig. 1 is a broken elevational view of a column embodying the invention;

Fig. 2 is an enlarged broken vertical section through the column;

Figs. 3, 4 and 5 are horizontal sections through the column taken on lines 3—3, 4—4 and 5—5, respectively, of Fig. 2;

Fig. 6 is a fragmentary plan view, partly in section, and on an enlarged scale, of a collector trough and grid; and Fig. 7 is a side elevational view, partly in section, of the trough and grid shown in Fig. 6.

In the drawings the numeral 7 designates a column, as for example, a rectifying column, which, in accordance with the invention, consists of packed sections 8 which alternate with distributor sections 9. The number of such sections, and the distance between distributor sections, will depend upon the requirements of the particular operation in which the column is to be used as will more fully hereinafter appear.

The vapor inlet to the column is shown at 10 and the vapor outlet at 11. The liquid inlet is shown at 12 and the liquid outlet at 13. A discharge level control 14 is connected with the bottom of the column through a pressure equalizer 15 and the liquid outlet 13, the liquid being drawn off from the equalizer through an outlet 16. Gauge glasses 17 and 18 are provided on the liquid level control and on the bottom section of the column, respectively, and the latter is also provided with a drain pipe 19 which is closed by a gate valve 20.

Each packed section 8 consists of a shell which forms the wall of the column and into which is inserted a packing assembly. This assembly comprises a center shaft or pipe 21, grids 22, and packing which will presently be described. The grids 22 are designed to be slipped onto the shaft 21 and spaced thereon at desired intervals to provide support for the packing. Details of the grids are shown in Figs. 5, 6 and 7 from which it will be observed that each grid comprises a plurality of radially disposed bars 23 the inner ends of which are welded to a pipe collar 24 and the outer ends of which extend nearly to the shell. The collar 24 may be slipped onto the shaft 21 and is secured thereto by a bolt 25. Each bar 23 supports a collector trough 26, the trough being rigidly secured to the bar by legs 27 which hold the trough in an inwardly, downwardly inclined position so that liquid falling thereon flows from the outside toward the center of the column, as shown in Figs. 2 and 7. It will be noted that these troughs 26 are paddle-shaped, the outer end portions 28 being somewhat flatter and wider to provide at the outer portion of the column a greater surface for catching the downcoming liquid which, as explained, tends to migrate toward the outside of the column. The outer ends of the troughs approach quite closely to the inner face of the shell, and the inner ends are bent upwardly, as indicated at 29, to split the flow. In the embodiment shown the grids 22 each contain eight of the collector troughs and the unit is tied together by rods 30 which are welded to the radial bars 23 to form a rigid frame.

Between these collector troughs 26, and resting directly on the rods 30, is a layer 31 of fibrous packing material, such as fiber glass, which is arranged so that the fibers slope downwardly and inwardly in a direction generally parallel to the troughs 26 as shown in Figs. 2 and 5. Above the layer 31, and resting directly thereon, is the main mass of packing 32 which preferably consists of fiber glass arranged in mats, as shown, with the fibers oriented in a generally vertical direction so that the liquid will flow in films down the fibers instead of forming drops and dripping from fiber to fiber.

When the desired amount of packing 32 has been placed on a grid 22 another like grid is slipped on the shaft 21 and bolted in such position that the radial collector troughs 26 thereon are displaced radially from those of the grid below so that they come between the latter and not in axial alignment therewith. Packing 31 and 32 is placed on this grid, just as for the preceding one, and successive grids and packing are placed on the center shaft, with each succeeding grid positioned with its collector troughs displaced radially from those immediately below, until the desired height of packed section is completed, the packing all being done as the assembly is progressively lowered into the shell.

The distributor sections 9, which alternate with the packed sections 8, will now be described, reference being had particularly to Figs. 2, 3 and 4. Each such section consists of a shell section, into which is welded a collector plate 33, an external trap 34, and an annular distributor trough 35 disposed below plate 33 and supported by pipes 36 which are welded to the shell, as shown in Fig. 4. Plate 33 is provided with a central opening to receive center shaft 21, a sleeve 37 extending upwardly from the plate to prevent liquid from flowing through said opening. Chimneys 38 are provided in plate 33, there being four in the embodiment shown, to permit upflow of vapors, the tops of the chimneys being partially closed by covers 39 which are slotted, as indicated at 40, to provide louvered openings which allow free upward flow of vapors with little or no down flow of liquid. Downcoming liquid is collected on plate 33 from which it is conducted by a pipe 41 to trap 34 where any particles of packing are allowed to settle out. The liquid is then conducted by a pipe 42 to the distributor trough or ring 35 which, as will be observed from Fig. 2, is provided in its bottom and side walls with spray holes 43 through which the liquid passes onto the packing below. The holes 43 are of such size and number, and are so positioned, that predetermined portions of the total liquid downflow are directed into predetermined concentric annular areas, thus giving the desired distribution from the center of the column to the outside wall. Any flow of liquid in excess of the spray capacity is allowed to overflow toward the center of the column through overflow spouts 44.

It will be noted that the center shaft 21 extends through the distributor sections, thus supporting the weight of all of the packing assemblies. This shaft is in sections, as shown in Fig. 2, the individual shaft sections corresponding in length to the height of the various column sections. The lower end of each shaft section, except the lowermost, is welded to a round plate 45 which in turn is welded to a dowel 46, the latter being received in the upper end of the next lower shaft section. The lower end of the assembled shaft is supported on a frame consisting of cross bars 47 and 48 the outer ends of which are welded to the lowermost shell section, and the upper end of said shaft is closed by a removable cap 49. This shaft thus becomes one continuous support for the grids 22 and the packing resting thereon, the only weight on the shell above the point where the bars 47 and 48 are secured thereto being that of the shell sections themselves plus the collector plates 33, the traps 34, and the distributor troughs 35. Although the packing assemblies are thus not supported by the shell sections in which they are housed they are held against lateral movement by the contact of the packing with the shell wall. It will be observed that the construction is flexible and lends itself well to various types of operations where the particular requirements as to height and number of packed sections and distributor sections may vary considerably. When a packed section is filled it may be assembled with other packed sections, or with distributor sections, by setting one on the other and bolting together the shell flanges 49, gaskets 50 being interposed to provide a gas tight seal.

A brief résumé of the manner in which the column functions may now be considered. The reflux returning to the top of the column through liquid inlet pipe 12 flows into the uppermost distributor ring 35 from whence it is sprayed uniformly onto the mass of packing 32 in the uppermost of the packed sections 8. This liquid flows downwardly on the surface of the packing material and gradually migrates outwardly toward the wall of the column, being in continuous contact with the upflowing vapors which have entered the bottom of the column through vapor inlet pipe 10. By the time the liquid has travelled down to the first series of grids 22 the $o/v$ value at the outer portion of the column is slightly greater than at the center of the column. This is corrected, and the proper $o/v$ value is re-established at that point, by the return toward the center of the column of that portion of the liquid which falls into the first or uppermost series of radial conductor troughs 26 plus that portion which flows inwardly along the threads or strands of the layer of packing 31. This process is repeated from grid to grid, the liquid flowing downwardly through the packing against the upwardly travelling vapors until such quantity of liquid has reached the shell that it is advisable, in order to keep the $o/v$ value substantially constant throughout the column, to collect and redistribute all the liquid. At that point the liquid falls onto the first or uppermost of the collector plates 33, and after being passed through trap 34, is conducted to the distributor ring 35 where it is redistributed over the mass of packing 32 from whence the process is continued as before until the liquid finally reaches the bottom of the column where it is drawn off through pipe 13, equalizer 14 and pipe 16.

The column may consist of any required number of packed sections with any required spacing of grids and distributors. Also in operations where the composition of the liquid changes, as in fractionation or rectification, consideration is given to the fact that a fixed number of moles flowing down the column results in a varying number of gallons as the composition changes. For example in an alcohol rectifying column if 1,000 gallons of 191 proof alcohol is refluxed to the top of the column there are only 405 gallons flowing down at the point where the proof is 40. The number and size of the holes 43 in the distributor rings 35 are therefore appropriately varied at the different levels to take care of this change in composition.

The types of packing material may vary considerably. Fibrous packing material is preferred, as for example coarse glass fiber which can be banded into mats and stood on end to form the packing 32, and arranged in a layer to form packing 31. This material is very light in weight and has an exceptionally high percentage of free volume as well as a large surface exposure, all of which is highly desirable. However vegetable or metal fibers might be used if they have the desired qualifications as to lightness, surface, free volume and orientation.

Our work with this column has shown that it operates well with vapor velocities much higher than can be tolerated by plate columns or by packed columns having lower percentages of free volume. The effectiveness is very materially increased through maintenance of the proper and uniform $o/v$ value throughout the column. Thus the invention makes possible a material reduction in the diameter of the column for any specific capacity as compared to types heretofore used.

What we regard as new and desire to secure by Letters Patent is:

1. In a contact column, a plurality of column sections superposed one on another, a base for supporting said sections and having means therein for introducing and directing a gas upwardly into the column and for receiving liquid flowing down the column, a removable shaft supported on said base and extending axially of the column through the several sections thereof, said shaft being formed of individually removable sections corresponding in height to the column sections, packing disposed in alternate sections of the column and supported independently of the column walls by grids carried on said shaft sections, and closure means at the top of the column including an escape outlet for gas and means for introducing and distributing a liquid over the packing in the uppermost section of the column.

2. In a contact column, a plurality of column sections superposed one on another, a base for supporting said sections and having means therein for introducing and directing a gas upwardly into the column and for receiving liquid flowing down the column, a shaft supported on said base and extending axially of the column through the several sections thereof, packing disposed in alternate sections of the column and supported independently of the column walls by grids carried on said shaft, means supported on said grids for collecting portions of the downflowing liquid and directing it toward the center of the column, means carried by the column sections intervening said packed sections for collecting liquid flowing from said packing and redistributing it uniformly over the packing therebelow, and closure means at the top of the column including an escape outlet for gas and means for introducing and distributing a liquid over the packing in the uppermost section of the column.

3. In a contact column, a plurality of column sections superposed one on another, a base for supporting said sections and having means therein for introducing and directing a gas upwardly into the column and for receiving liquid flowing down the column, a removable shaft supported on said base and extending axially of the column through the several sections thereof, said shaft being formed of individually removable sections corresponding in height to the column sections, packing disposed in alternate sections of the column and supported therein by grids carried on said shaft sections, means comprising radially disposed troughs supported on said grids for collecting portions of the downflowing liquid and directing it toward the center of the column, the troughs for the several grids being radially displaced from one another to avoid axial alignment thereof, and closure means at the top of the column including an escape outlet for gas and means for introducing and distributing a liquid over the packing in the uppermost section of the column.

4. In a contact column, a plurality of column sections superposed one on another, a base for supporting said sections and having means therein for introducing and directing a gas upwardly into the column and for receiving liquid flowing down the column, a removable shaft supported on said base and extending axially of the column through the several sections thereof, said shaft being formed of individually removable sections corresponding in height to the column sections, packing disposed in alternate sections of the column and supported therein by grids carried on said shaft sections, means comprising radially disposed troughs supported on said grids for collecting portions of the downflowing liquid and directing it toward the center of the column, the troughs for the several grids being radially displaced from one another to avoid axial alignment thereof, means carried by the column sections intervening said packed sections for collecting liquid flowing from said packing and redistributing it uniformly over the packing therebelow, and closure means at the top of the column including an escape outlet for gas and means for introducing and distributing a liquid over the packing in the uppermost section of the column.

5. In a contact column, a plurality of column sections superposed one on another, a base for supporting said sections and having means therein for introducing and directing a gas upwardly into the column and for receiving liquid flowing down the column, a shaft supported on said base and extending axially of the column through the several sections thereof, packing disposed in alternate sections of the column and supported therein by grids carried on said shaft, means supported on said shaft for collecting portions of the downflowing liquid and directing it toward the center of the column, a collector plate disposed transversally of the column in each section intervening said packed sections, said plate having louvered openings therein allowing passage of gas but obstructing passage of liquid, an annular container supported below each collector plate and having openings therein placed to direct liquid flowing therefrom uniformly over the cross-sectional area of the column, a conduit for conveying liquid from said plate into said container, means in said conduit for freeing the liquid of particles of packing, and closure means at the top of the column including an escape outlet for gas and means for introducing and distributing a liquid over the packing in the uppermost section of the column.

CHARLES H. RODGERS.
GEORGE C. NEUREUTHER.

CERTIFICATE OF CORRECTION.

Patent No. 2,384,424.  September 4, 1945.

CHARLES H. RODGERS, ET AL.

It is hereby certified that error appears in the printed specification of the above numbered patent requiring correction as follows: Page 1, second column, line 9, for "is 8." read --is .8.--; and that the said Letters Patent should be read with this correction therein that the same may conform to the record of the case in the Patent Office.

Signed and sealed this 29th day of January, A. D. 1946.

Leslie Frazer (Seal)

First Assistant Commissioner of Patents.